United States Patent
Krishnan et al.

(10) Patent No.: US 8,495,713 B2
(45) Date of Patent: Jul. 23, 2013

(54) SYSTEMS AND METHODS FOR HOST AUTHENTICATION

(75) Inventors: Suresh Krishnan, Montreal (CA); Alan Kavanagh, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 310 days.

(21) Appl. No.: 12/965,552

(22) Filed: Dec. 10, 2010

(65) Prior Publication Data

US 2011/0283344 A1 Nov. 17, 2011

Related U.S. Application Data

(60) Provisional application No. 61/345,346, filed on May 17, 2010.

(51) Int. Cl.
*H04L 29/06* (2006.01)

(52) U.S. Cl.
USPC ............................................. 726/5

(58) Field of Classification Search
USPC ............................................. 726/5
See application file for complete search history.

(56) References Cited

U.S. PATENT DOCUMENTS

| | | | |
|---|---|---|---|
| 2005/0021979 A1* | 1/2005 | Wiedmann et al. | 713/182 |
| 2005/0152305 A1* | 7/2005 | Ji et al. | 370/328 |
| 2006/0039340 A1* | 2/2006 | Ptasinski et al. | 370/338 |

* cited by examiner

*Primary Examiner* — Michael S McNally
(74) *Attorney, Agent, or Firm* — Christopher & Weisberg, P.A.

(57) ABSTRACT

Systems and methods provide for authenticating a device. A method for authenticating a device can include receiving, at communications node, a first message, wherein the first message includes a first Extensible Authentication Protocol (EAP) packet which includes an EAP (Identify) ID response and a first destination address; generating, by the communications node, a second message, wherein the second message includes the first EAP ID response and a second destination address which is different from the first destination address; and transmitting, by the communications node, the second message toward the second destination address.

14 Claims, 7 Drawing Sheets

SYSTEMS AND METHODS FOR HOST AUTHENTICATION

RELATED APPLICATION

This non-provisional patent application is related to, and claims priority based upon, U.S. Provisional Patent Application Ser. No. 61/345,346, filed on May 17, 2010, entitled "Host Authentication", the disclosure of which is expressly incorporated here by reference.

TECHNICAL FIELD

The embodiments of the subject matter disclosed herein generally relate to communications of devices with a network and more particularly to device authentication with a network.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc., also allow users to communicate via e-mail, video conferencing, IM, and the like. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases, which in turn creates more usage, and leads to more services and system improvements.

For example, with the advancement of Internet technologies and mobile telephony, users want to enjoy new communication services, which can be accessed anytime, anywhere, on any device, independent of the access network. Users expect services that support their mobility at home, on travel, and on business, and want to be able to use different end user devices. They expect service profiles tailored to the end user devices' capabilities, which enable them to switch easily between their private and business roles, i.e., from one device used at home to another device used at a business location. Moreover, users desire devices which enable easy and comfortable subscriber self-administration.

As more users, devices and services reach the market place, more networks, intermediate nodes, access nodes, routers, firewalls and the like are expected to come into use to support the delivery of services to the users and their devices. With this proliferation of networks, intermediate nodes, access nodes, routers and firewalls it is expected, at a macro level, that there will be challenges involved with access, authorization, security and identification. These challenges could be compounded by different operator networks, different generations of devices, the movement of devices between networks and trust issues between nodes and networks.

Accordingly, systems and methods for authenticating devices with networks under various circumstances are desirable.

SUMMARY

Exemplary embodiments describe authenticating a device which is behind a residential gateway with a network, e.g., a Fixed Broadband network. By changing out destination and source addresses in various messages, authentication signalling can be exchanged between the device and an authentication server associated with the network without modifying the current 802.1x protocol.

According to an exemplary embodiment there is a method for authenticating a device. The method includes: receiving, at a communications node, a first message, wherein the first message includes a first Extensible Authentication Protocol (EAP) packet which includes an EAP (Identify) ID response and a first destination address; generating, by the communications node, a second message, wherein the second message includes the first EAP ID response and a second destination address which is different from the first destination address; and transmitting, by the communications node, the second message toward the second destination address.

According to another exemplary embodiment there is a system for authenticating a device at a communications node. The system includes a communications interface configured to receive a first message, wherein the first message includes a first Extensible Authentication Protocol (EAP) packet which includes an EAP (Identify) ID response and a first destination address. The system also includes a processor configured to generate a second message, wherein the second message includes the first EAP ID response and a second destination address which is different from the first destination address, wherein the second message is transmitted toward the second destination address.

BRIEF DESCRIPTION OF THE DRAWINGS

The accompanying drawings illustrate exemplary embodiments, wherein.

DETAILED DESCRIPTION

Figure 1:
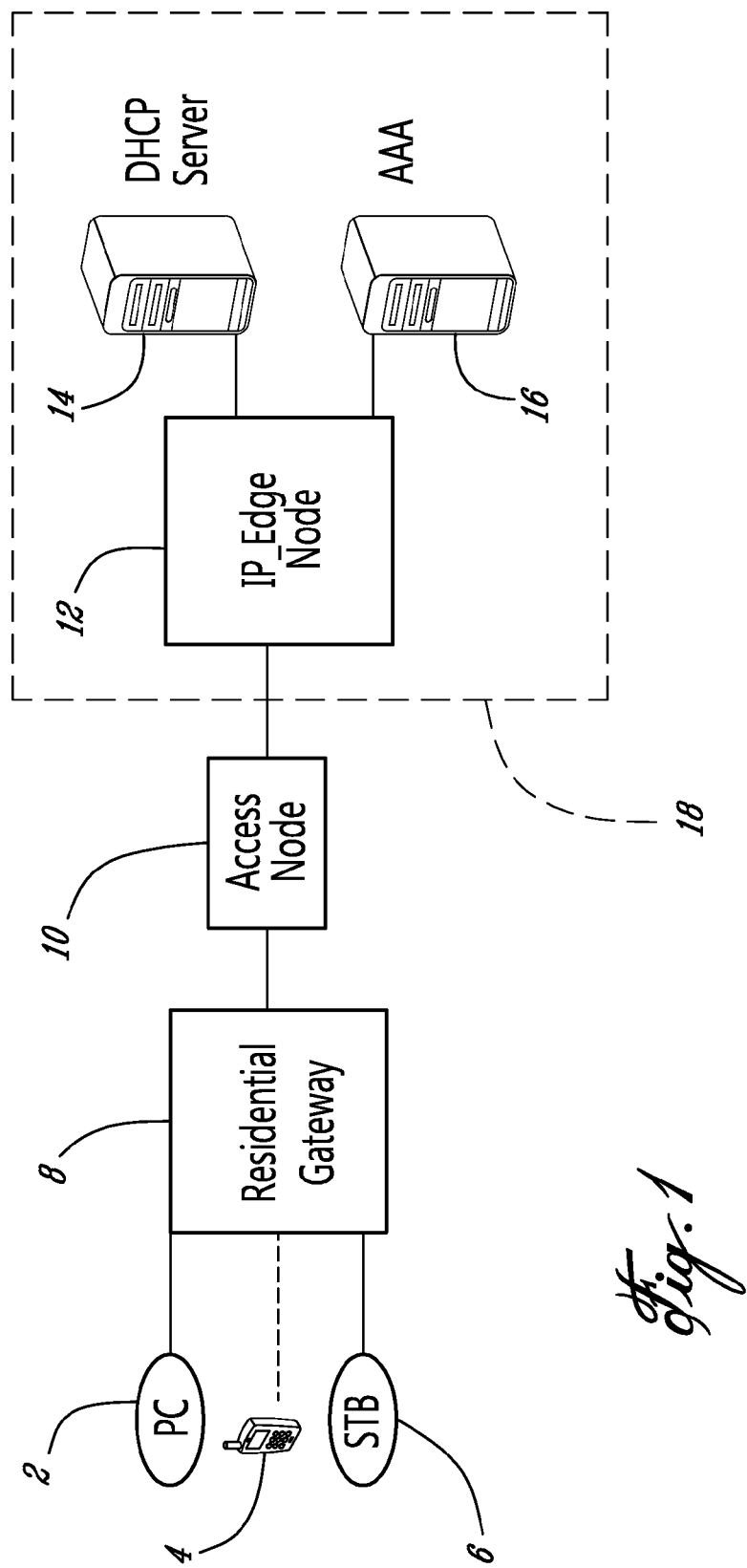
FIG. 1 depicts an architecture according to exemplary embodiments.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Methods and systems which can include, residential gateways (RGs), access nodes (ANs) and (Internet Protocol) IP_Edge nodes (or border network gateways (BNGs)), servers and networks for enabling authentication of one or more User Equipments (UEs) are described herein according to various exemplary embodiments. This allows for a device which is hidden behind an RG to authenticate with a Fixed Broadband network. Prior to describing the various exemplary embodiments in detail, appropriate contextual material followed by an exemplary architecture for the implementation of exemplary embodiments will now be described.

The Broad Band Forum (BBF) is currently working on standards for authenticating IP Subscriber Devices and their IP Sessions. This occurs, for instance, when an IP device is connected to a Fixed Broadband Access Network via an RG. The BBF is now moving towards Fixed Mobile Convergence standards work whereby a third generation (3G) mobile device can connect over Wi-Fi to the Fixed Broadband Network and obtain services, for instance, directly from the Fixed Broadband Network, through the Internet or via the home 3G service provider. Similarly it is intended that any device should be able to retrieve services independently of the access type or where they reside and connect to the network.

According to exemplary embodiments, the RG can be operated in either of two modes. The Layer-3 mode, also known as "Routed", allows all devices behind the RG in the home network have their communications routed to them via the RG. In the Layer-3 mode, the RG is the default gateway for all the home devices. The other mode for the RG is Layer-2 mode, also known as "Bridged" mode, whereby all the home devices are connected to the IP_Edge Node. In the Layer-2 mode, the IP_Edge Node sees all the devices and is the default gateway for all the home devices as the RG bridges all the IP Sessions to the IP_Edge Node.

RGs and IP devices today typically support the 802.1x standard, which is used for passing authentication credentials between subscriber devices, such as a laptop or 3G mobile device, e.g., a UE, and a network node, such as an RG, within the same local area network (LAN). 802.1x is used for admission control for access to the network before an IP address is provisioned to the end user device. More information regarding the 802.1x standard protocol can be found at standards-.ieee.org, the disclosure of which is incorporated here by reference.

Currently in Fixed Broadband Networks, the RG can be authenticated by using dynamic host configuration protocol (DHCP). More specifically, the RG is authenticated by using a DHCP_OPT_82, which is appended by the access node to a DHCP_Discover (or DHCP_Solicit) message. The DHCP_Discover message is sent upstream from the RG or host in, for example, IP over Ethernet (IPoE) sessions. Another method of authentication is by using password authentication protocol (PAP) or challenge-handshake authentication protocol (CHAP) carried in the point to point protocol (PPP) session which is part of the PPP session establishment between the RG or IP host and the IP_Edge node (or BNG)/Broadband Remote Access Server (BRAS) node.

There are a number of challenges associated with these authentication techniques. For example, the IPoE authentication method only authenticates the actual subscriber line and not the devices (such as set-top-box, Voice over IP (VoIP) phones, laptops and UE devices) that are connected to the RG on the same access line. Individual user device authentication is generally desirable (e.g., in order to apply specific policies on Quality of Service (QoS), security and provide subscriber services for that dedicated subscriber). Similarly, the PPP session is run from the RG to the BRAS and does not provide authentication of the subscriber/device residing behind the RG. Also, PAP and CHAP are not considered very secure authentication protocol methods and new protocols such as Extensible Authentication Protocol (EAP) is the preferred choice. Moreover, 3G devices will connect over Wi-Fi to the Fixed Broadband Network and will typically not run PPP from the 3GPP UE.

Other factors which can be involved in authenticating are trust and managed versus unmanaged nodes. In many cases the operator network communicates with an intervening node which is not managed, e.g., an RG which is not managed by the network operator, between the network and the end user. Since the intervening node is not managed by the network operator, the operator network does not initially (if ever) trust the intervening node. This lack of trust requires correct authentication and methods to do so between the end user and the network at least for network security reasons. Accordingly, new systems and methods are desirable for authenticating devices, for example, behind an RG to a Fixed Broadband network are desirable.

According to exemplary embodiments, as technology evolves towards a Fixed and Mobile Converged (FMC) Network, 3G UE devices are likely to be connected to the Fixed Broadband Network via Wi-Fi in the home network through the RG, as shown in the purely illustrative exemplary architecture of FIG. 1. This exemplary architecture includes a personal computer (PC) 2 and a STB 6 which are connected by a wireline to an RG 8. A UE 4 (which can be a 3G UE, a 3GPP UE or other similar host device) is connected in a wireless manner to the RG 8. The RG 8 is connected to and communicates with AN 10 which in turn is connected to and communicates with an IP_Edge node 12 (which alternatively could be a BNG) associated with a Fixed Broadband network 18. The Fixed Broadband network 18 includes a DHCP server 14 and an Authentication, Authorization and Accounting (AAA) server 16. Both the DHCP server 14 and the AAA server 16 can communicate with the IP_Edge node 12.

Using the exemplary architecture shown in FIG. 1, it is expected that the subscriber will need to be identified by the Fixed Broadband Network that it is connected to for various reasons (e.g., in order to provide dynamic policy control and services, to be able to identify the UE 4 for Lawful Intercept and E-911 services, to provide billing and accounting, etc.). Similarly where the UE 4 is connected to the IP_Edge node 12 over Fixed Wi-Fi, the IP_Edge node 12 shall be able to tunnel the traffic from identified UE 4 devices back to the Home Packet Data Network (PDN) node. Authentication is the key to providing these exemplary services while guaranteeing the subscriber is permitted access to those services.

Currently, the UE 4 and other IP devices such as PCs 2 and Laptop devices support 802.1x protocol as do most Wi-Fi based RGs 8. In the Routed RG case, the 802.1x protocol is used to carry the authentication credentials between the subscriber device, e.g., UE 4, and the RG 8. However, authentication of the subscriber devices by the RG 8 is not sufficient in the context of services provided through the IP_Edge node 12.

Exemplary embodiments described herein include systems and methods for carrying authentication credentials upstream to the AAA Server 16 in the Fixed Broadband Network 18 connected to the IP_Edge node 12. The AAA Server 16 is then able authenticate the subscriber/subscriber device within the Fixed Broadband Network or to proxy the authentication back to the subscribers home network to authenticate the subscriber/subscriber device. For example, the Extensible Authentication Protocol—Authentication and Key Agreement (EAP-AKA) or Extensible Authentication Protocol—Subscriber Identity Module (EAP-SIM) can be carried from the UE 4 up to the IP_Edge node 12, which then proxies the authentication request to a local AAA Server 16.

The UE 4 uses EAP-AKA or EAP-SIM to authenticate with an Authentication Server such as the AAA server 16. The Fixed Broadband network 18 may perform access authentication by either locally authenticating the UE 4 or proxying the authentication messages back to the home 3GPP subscriber network. When the subscriber authentication is proxied back to the home subscriber's network, which may be another network service provider, the Fixed Broadband Service Provider (SP) will proxy the authentication and wait until it receives a valid Authentication Accept message from the home network. Upon reception of the valid Authentication Accept message, the Fixed Broadband SP takes appropriate action for the UE 4, e.g., grants access to the Fixed Broadband network 18, provides the UE 4 with differentiated services, installs subscriber policies received from the home network for this subscriber, etc.

A UE 4 can have, for example, both a long term evolution (LTE) and a wireless local area network (WLAN) modem providing the user access to the service provider's wireless LTE network and the service providers Fixed Broadband network 18 via Wi-Fi. The Fixed Broadband network can be accessed either from a Wi-Fi Hot Spot or from an RG 8 which also provides WLAN connectivity to the devices in the home subscriber's network or any subscriber RG 8.

According to exemplary embodiments, when a dual mode UE 4 attaches to a fixed network, it authenticates to its home 3GPP network through the RG 8 and the IP_Edge node 12. Exemplary embodiments support swapping of the destination address (DA) of upstream EAP packets sent by the UE 4, replacing the DA with the destination address of the AN 10 or IP_Edge Node 12 at the appropriate nodes. This is used to overcome the current situation whereby the UE 4, when sending the EAPoL packets upstream, sets the destination address of such packets to an address which is not useful in allowing the UE 4 to become authenticated with the Fixed Broadband network 18. More specifically, current solutions use the address in the Ethernet frame which is dropped by a first switch to avoid switching loops which results in 802.1x systems to not be able to pass through more than one level 2 switch since 802.1x uses the same destination addresses as the spanning tree.

Figure 2:
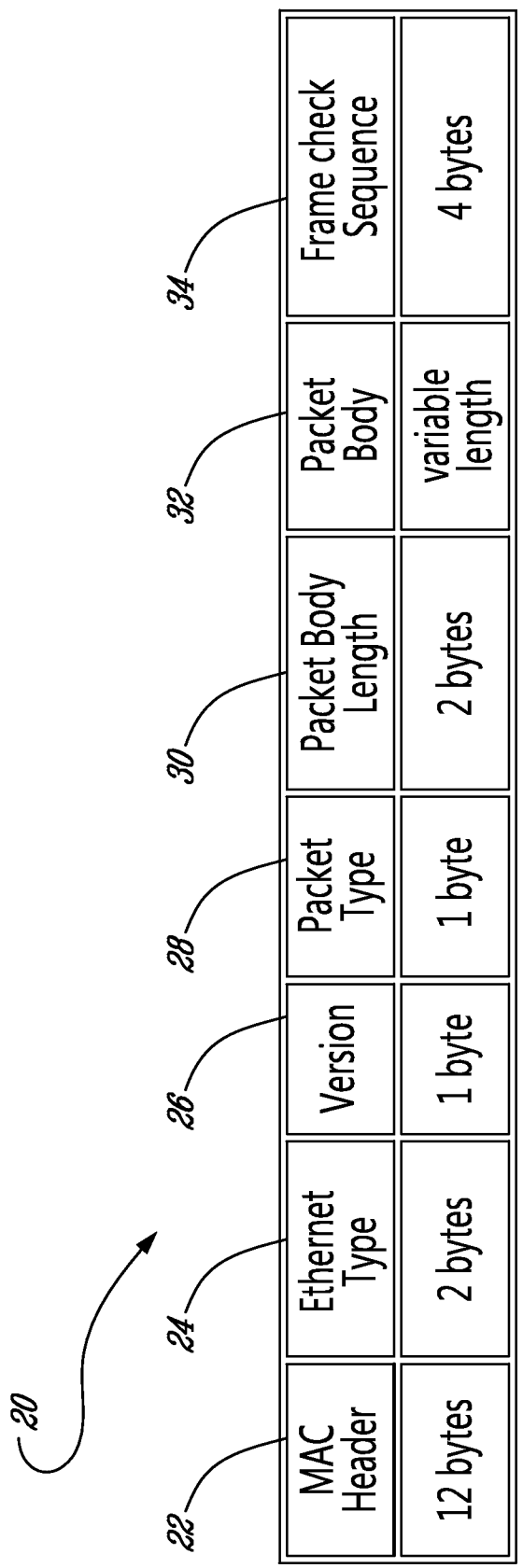
FIG. 2 illustrates an Extensible Authentication Protocol frame according to exemplary embodiments.
Figure 3:
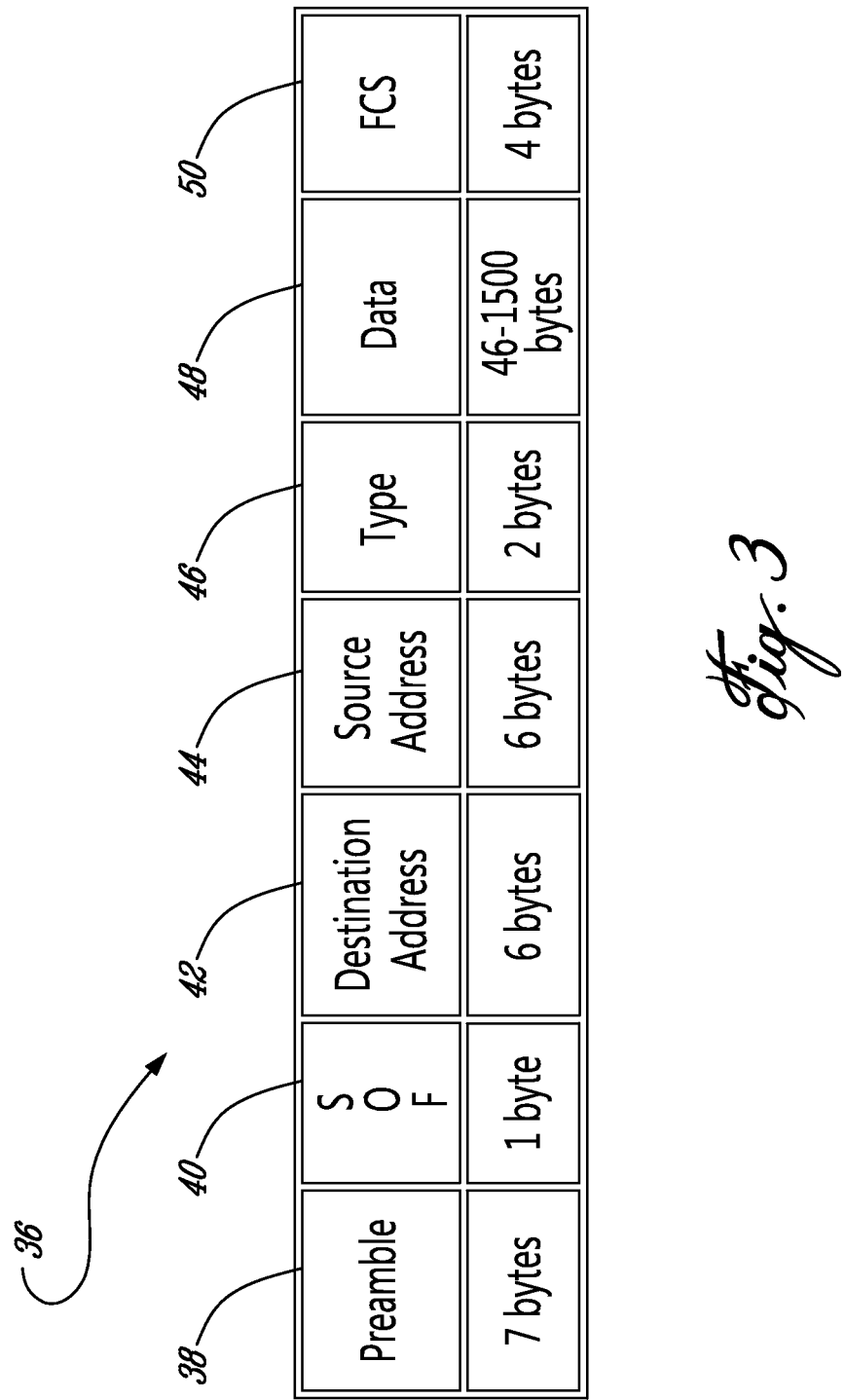
FIG. 3 shows an Ethernet frame according to exemplary embodiments.

According to exemplary embodiments, EAP frames (also called EAP packets herein) can be used in transmitting data between nodes and devices in support of exemplary embodiments described herein. An example of an EAPoL frame 20 is shown in FIG. 2. The EAPoL frame 20 includes seven fields, a MAC header field 22, an Ethernet Type field 24, a Version field 26, a Packet Type field 28, a Packet Body Length field 30, a Packet Body field 32 and a Frame Check Sequence field 34. Additionally, the field sizes are shown in FIG. 2. According to an exemplary embodiment, EAPoL packets 20 can be inserted into (encapsulated by) Ethernet frames. An example of an Ethernet frame 36 is shown in FIG. 3. The Ethernet frame 36 includes a Preamble field 38, a Start-of-Frame delimiter (SOF) field 40, a Destination Address field 42, a Source Address field 44, a Type field 46, a Data field 48 and a Frame check sequence (FCS) field 50. The field sizes in bytes are shown below each field of the Ethernet frame 36 in FIG. 3.

Figure 4:
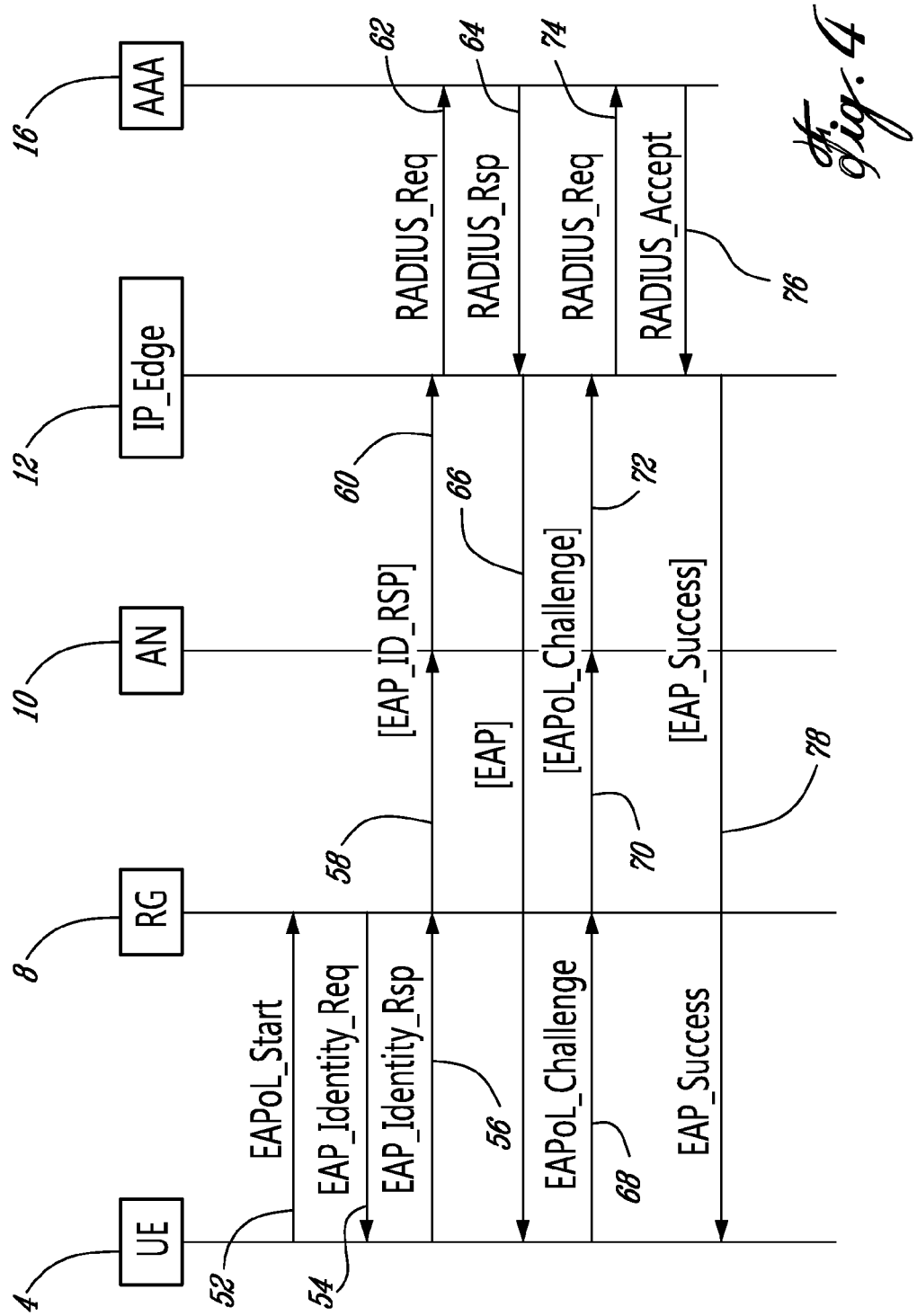
FIG. 4 illustrates a signalling diagram using a swapping of addresses in support of authentication of a device with a network according to exemplary embodiments.

According to an exemplary embodiment, an authentication message sequence flow for the UE 4, which acts as a host, in the Fixed Broadband network 18 is shown with respect to the exemplary signalling diagram shown in FIG. 4. This authentication is performed by swapping out the source and destination MAC address of some of the messages at the different nodes as described below. Additionally, the authentication methods described below with respect to FIG. 4 can apply to any host running 802.1x and not just to the exemplary dual mode UE 4 described in this example.

Initially, the UE 4 attaches to the Wi-Fi enabled RG 8 by sending an EAPoL_Start message 52 to the RG 8. The RG 8, upon detecting the UE 4, initiates the authentication by asking for the identity of the user by sending an EAP_Identity_Request message 52 to the UE 4. The UE 4 responds by sending an EAP_Identity_Response message 56 back to the RG 8. The RG 8 receives the EAP_Identity_Request message where the received source address is the MAC address of the UE 4 and the received destination address is a multicast address from the Spanning Tree Protocol Address range. The RG 8 swaps out the destination address and sets it to the AN's 10 MAC address and transmits the message 58 to the AN 10.

The AN 10, upon receiving this EAP frame in message 58, swaps out the destination address and inserts the IP_Edge node's 12 MAC address as the destination address and transmits the message 60 to the IP_Edge node 12. The IP_Edge node 12, upon receiving the EAP frame in message 60, inserts the EAP frame into a RADIUS_Request message 62. According to another exemplary embodiment, the AAA server 16 may proxy this RADIUS_Request message 62 to another AAA Server 16 or respond directly. The AAA Server 16 responds to the IP_Edge node 12 with a RADIUS_Response message 64, containing an EAP challenge packet (or frame). The IP_Edge node 12 removes the EAP challenge packet from the RADIUS_Response message 64 and sends it to the UE 4 with the source address set to the IP_Edge node's 12 MAC address and the DA set to the address of the UE 4 in message 66. Message 66 will pass through the AN 10 and the RG 8 in a basically transparent manner.

According to exemplary embodiments, the UE 4 responds to the EAPoL_Challenge packet and sets the source MAC address to that of the UE 4 and the DA is a multicast address from the Spanning Tree Protocol Address range in message 68 to the RG 8. The RG 8 swaps out the DA and sets it to the AN's 10 MAC address and transmits the response in message 70 to the AN 10. The AN 10, upon receiving the EAPoL packet, swaps out the DA and sets the DA to the IP_Edge node's 12 MAC address and transmits the response in message 72. The IP_Edge node 12 removes the EAP packet from message 72, inserts it into a RADIUS_Request message 74 and sends it to the AAA Server 16. According to an exemplary embodiment, it is possible that several rounds of challenges may occur until the UE 4 is fully authenticated or the authentication is rejected. The AAA Server 16 responds with a RADIUS Access Accept message 76 which is transmitted to the IP_Edge node 12. The IP_Edge node 12, upon receiving the RADIUS Access Accept message 76, sends an EAP Success Message to the UE 4. The authentication is now complete and the UE 4 accesses the Fixed Broadband network 18.

Figure 5:
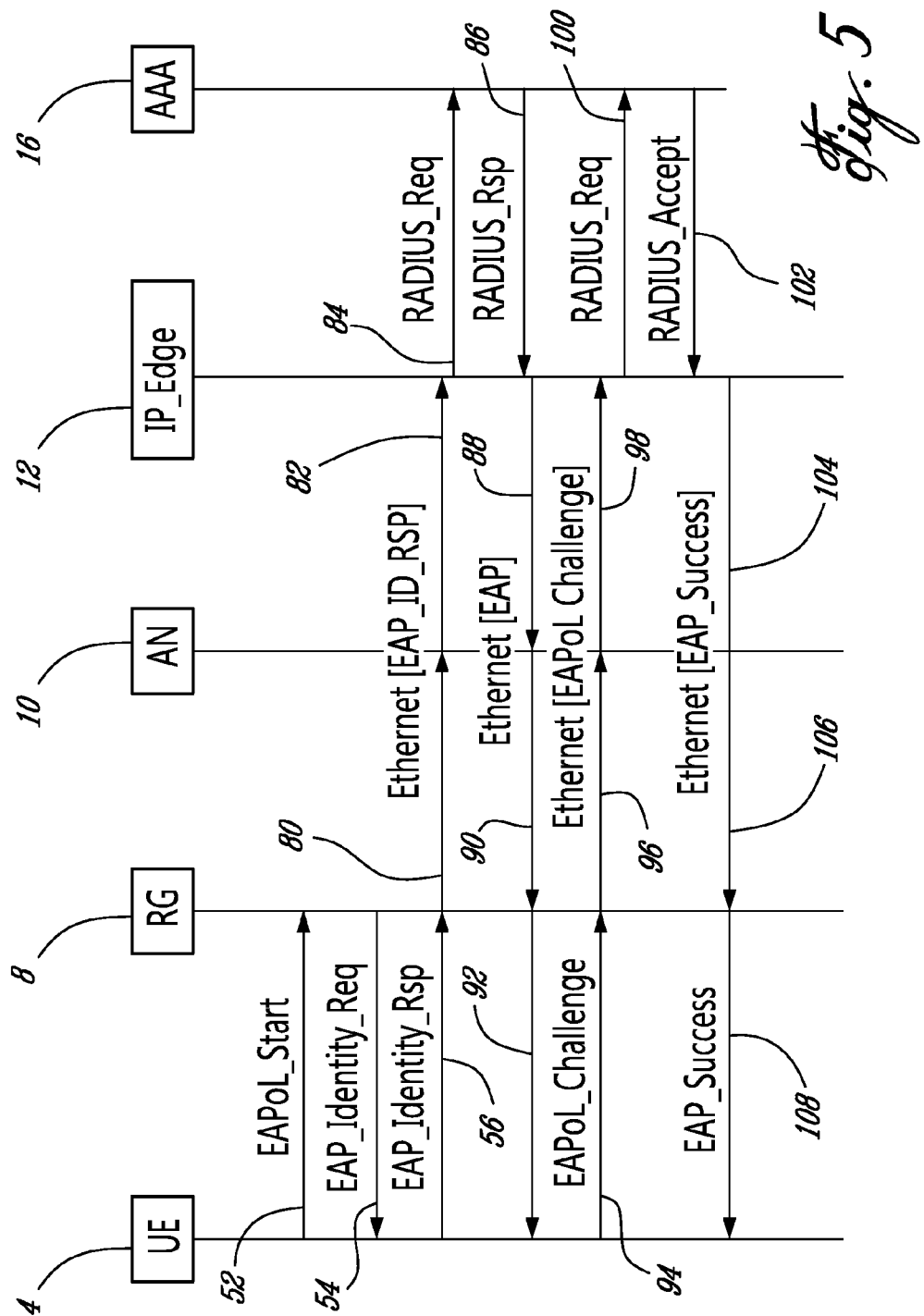
FIG. 5 shows a signalling diagram using Ethernet encapsulation in support of authentication of a device with a network according to exemplary embodiments.

The foregoing exemplary embodiment discusses the swapping of addresses within the EAP packets themselves. Alternatively, an exemplary embodiment also supports using Ethernet to carry authentication credentials in the Fixed Broadband network 18 by encapsulating Extensible Authentication Protocol over LAN (EAPoL) packets (or frames) sent upstream from the UE 4 (or other host device which resides behind the RG 8 in, for example, a home network) within an Ethernet frame to the IP_Edge node 12 as shown in the signalling diagram of FIG. 5. This exemplary embodiment uses Ethernet encapsulation for carrying the 802.1x credentials and allows for minimal impact to the underlying transport network nodes as well as minimizing the impact on the RG 8 and the AN 10 to support authentication of the subscriber. Additionally, this authentication method can apply to any host running 802.1x.

Initially, the UE 4 attaches to the Wi-Fi enabled RG 8 by sending an EAPoL_Start message 52 to the RG 8. The RG 8, upon detecting the UE 4, initiates the authentication by asking for the identity of the user by sending an EAP_Identity_Request message 52 to the UE 4. The UE 4 responds by sending an EAP_Identity_Response message 56 back to the RG 8. The RG 8 upon receiving the EAP_Identity_Response message 56 encapsulates the EAPoL packet in an Ethernet frame, i.e., by placing the EAPoL packet in the Data field 48 of one or more Ethernet frames, and sets the Ethernet frame's source MAC Address to be the RG WAN interface address and the Ethernet frame's destination MAC address to the address of the AN 10 in the Ethernet message 80. The Ethernet message 80 is then transmitted to the AN 10. The Access Node 10, upon receiving this Ethernet Frame, removes the EAPoL packet (or frame) from the Ethernet frame and inserts the EAPoL packet into a new Ethernet frame, which is shown as message 82, and sets the Ethernet frame's source address as that of the AN 10 MAC address and the Ethernet frame's DA MAC address to that of the IP_Edge node 12 for message 82.

The IP_Edge node 12, upon receiving the Ethernet frame in message 82, removes the EAP packet from the Ethernet frame and inserts the EAP packet into a RADIUS_Request message 84 and transmits the RADIUS_Request message 84 to the AAA server 16. The AAA Server 16 responds to the IP_Edge node 12 with a RADIUS_Response message 86, which contains an EAP challenge packet. The IP_Edge node 12 removes the EAP challenge packet from the received RADIUS_Response message 86 and encapsulates this EAP challenge packet in an Ethernet frame in message 88 with the source address set to that of the IP_Edge node 12 and the destination address set to that of the AN 10. The AN 10 upon receiving the Ethernet frame in message 88 removes the EAPoL packet from the Ethernet frame and inserts the EAPoL packet into a new Ethernet frame in message 90. The AN 10 then sets the source address MAC address as that of the AN 10 and the destination address as that of the MAC Address to that of the IP_Edge node 12 for message 90 and transmits message 90 to the RG 8.

The RG 8 upon receiving the Ethernet frame in message 90, removes the EAPoL packet and forwards this to the UE 4 in message 92. The UE 4 responds to the EAPoL_Challenge packet and sets the source MAC address to that of the UE 4 and the destination address to a multicast address from the Spanning Tree Protocol Address range in message 94. The RG 8, after receiving message 94, encapsulates the EAPoL packet in an Ethernet frame in message 96 and sets the source address to that of the RG WAN interface's MAC address and sets the destination MAC address to that of the AN 10 for message 96. The RG 8 then transmits the message 96 to the AN 10. The AN 10 upon receiving the Ethernet frame in message 96 removes the EAPoL packet and inserts this into a new Ethernet Frame in message 98 and sets the source address to the MAC address of the AN 10 and the destination MAC address to that of the IP_Edge node 12. The AN 10 then transmits message 98 to the IP_Edge node 12.

The IP_Edge node 12 removes the EAP packet from the Ethernet frame of message 98 and inserts it into a RADIUS_Request message 100 which is then sent to the AAA Server 16. According to an exemplary embodiment, it is possible that several rounds of challenges may occur until the client, e.g., the subscriber using UE 4, is fully authenticated or the authentication is rejected. The AAA Server 16 responds with a RADIUS Access Accept message 102. The IP_Edge node 12, upon receiving the RADIUS Access Accept message 102, sends an EAP Success message 104 to the AN 10 by encapsulating this information in a new Ethernet frame with the source address MAC Address set to that of the IP_Edge node 12 and the destination address MAC address set to that of the AN 10.

The AN 10 upon receiving the Ethernet frame in message 104 removes the EAPoL packet and inserts it into a new Ethernet frame in message 106 and sets the source address MAC Address to that of the AN 10 and the destination address MAC address to that of the RG 8. The AN 10 then transmits message 106 to the RG 8. The RG 8, upon receiving the Ethernet frame in message 106, removes the EAPoL packet containing the EAP_Success information and forwards this to the UE 4 as message 108. The authentication of the UE 4 is now complete.

According to exemplary embodiments, systems and methods described herein do not impose any specific modifications to 802.1x hosts/supplicants such as 3GPP UE devices, laptop, PC's etc. Also, according to exemplary embodiments, the current 802.1x protocol specification is not affected by the present invention, which means that any device acting as a supplicant such as the UE 4 or the RG 8 does not require any modifications to the 802.1x protocol. Additionally, according to exemplary embodiments, the communications node functionality described herein can be combined, e.g., the functions of the RG 8 and the AN 10 could be combined or the AN 10 and the IP_Edge node 12 could be combined, as desired which can result in a potential reduction and/or modification of the signals described above with respect to FIGS. 4 and 5.

According to another exemplary embodiment, the IP_Edge node 12 can also perform the function of an authenticator. In this role of authenticator the IP_Edge node 12 follows out the instructions of the AAA server 16 to either allow or deny the UE 4 access to the Fixed Broadband network 18.

Figure 6:
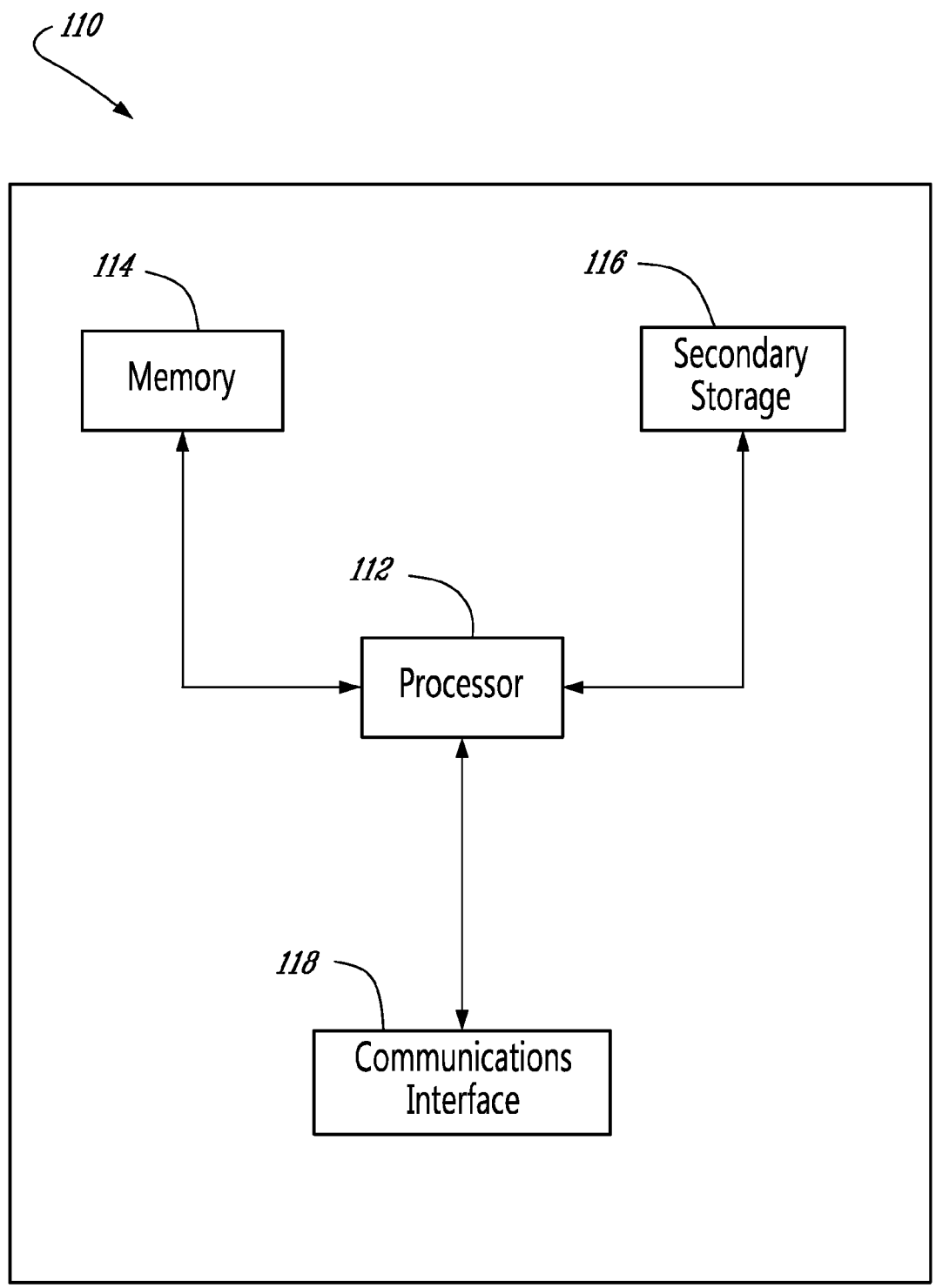
FIG. 6 illustrates a communications node according to exemplary embodiments.

The exemplary embodiments described above provide for authentication of a UE 4, which acts as a host, which is located behind the RG 8 in a Fixed Broadband network 18. An exemplary communications node 110, which can be the RG 8, the AN 10, the IP_Edge node 12 or any node with similar functionality, will now be described with respect to FIG. 6. The communications node can contain a processor 112 (or multiple processor cores), memory 114, one or more secondary storage devices 116 and an interface unit 118 to facilitate communications between communications nodes, devices, e.g., UE 4, AAA server 16 and the rest of the network. The processor 502 can execute instructions to facilitate the exemplary embodiments described above with respect to the signalling diagrams shown in FIGS. 4 and 5 for each of the various communications nodes as well as for the methods described with respect to the flowchart of FIG. 7. Memory 114 can store instructions, applications and the like which may be used by the processor 112 in support of the exemplary embodiments described herein.

Figure 7:
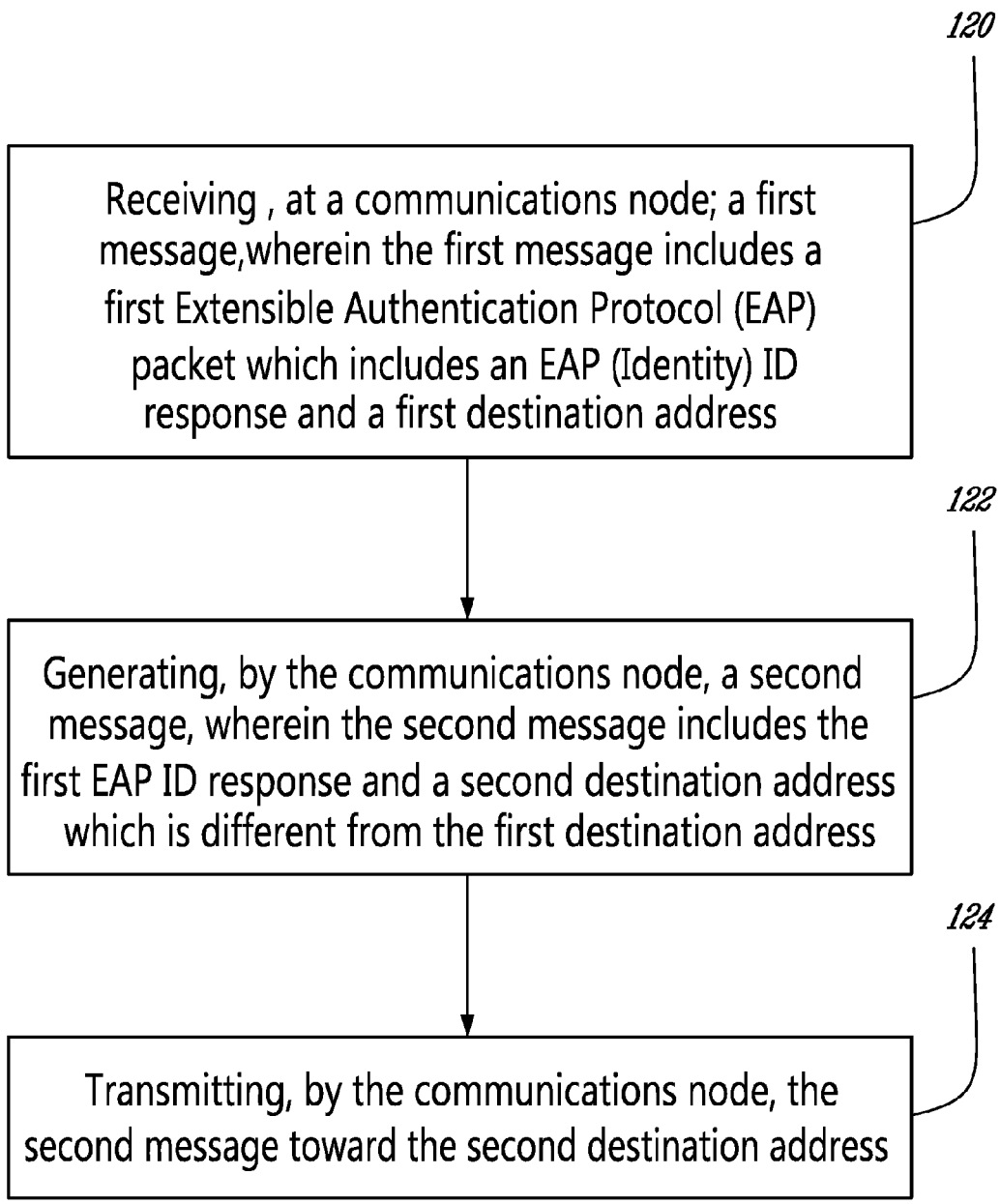
FIG. 7 is a flowchart illustrating a method for authenticating a device according to exemplary embodiments.

An exemplary method for authenticating a device is illustrated in FIG. 7. Therein, at step 120, receiving, at a communications node, a first message, wherein the first message includes a first Extensible Authentication Protocol (EAP) packet which includes an EAP (Identify) ID response and a first destination address; at step 122, generating, by the communications node, a second message, wherein the second message includes the first EAP ID response and a second destination address which is different from the first destination address; and at step 124, transmitting, by the communications node, the second message toward the second destination address.

According to an exemplary embodiment, the communication node 110 can be an RG 8. When used in this exemplary capacity, the method illustrated in FIG. 7 can be expanded as will now be described. Receiving, at the residential gateway 8, a third message, wherein the third message includes a response to an EAP challenge and the first destination address; creating a fourth message which includes the response to the challenge from the authentication server network and the second destination address; and transmitting the fourth message to the second destination address.

According to an exemplary embodiment, the communication node 110 can be an AN 10. When used in this exemplary capacity, the method illustrated in FIG. 7 can be expanded as will now be described. Receiving, at the access node 10, a third message, wherein the third message includes a response to an EAP challenge and the first destination address; creating a fourth message which includes the response to the challenge from the authentication server network and the second destination address; and transmitting the fourth message to the second destination address.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items. Skilled readers will readily acknowledge that these are provided to illustrate the teachings of the invention and should not be construed as the only possible implementations of the present invention. More specifically, while the present invention is described in view of a 3G user equipment device, it should be understood that many of the exemplary embodiments described herein are applicable to any IP device such as smartphones (3G, 4G, LTE, or any other technology), laptops, PDAs, VoIP phones, PCs, set-top boxes (STBs), etc.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for authenticating a device comprising:
receiving, at an access node, a first message, the first message including a first Extensible Authentication Protocol (EAP) packet which includes an EAP (Identify) ID response and a first destination address;
generating, by the access node, a second message, wherein the second message includes the first EAP ID response and a second destination address which is different from the first destination address; and
transmitting, by the access node, the second message toward the second destination address; and
the first destination address being a media access control (MAC) address of the access node associated with an authentication server, the second destination address being a MAC address of an IP_Edge node associated with the authentication server, and the second destination address being swapped for the first destination address by the access node.

2. The method of claim 1, further comprising:
receiving, at the access node, a third message, wherein the third message includes a response to an EAP challenge and the first destination address;
creating a fourth message which includes the response to the challenge from the authentication server network and the second destination address; and
transmitting the fourth message to the second destination address.

3. The method of claim 2, further comprising:
encapsulating the first EAP packet into a first Ethernet frame in the second message.

4. The method of claim 3, further comprising:
receiving a fifth message, wherein the fifth message includes a second Ethernet frame with a second EAP packet which includes a challenge from the second network;
removing the second EAP packet and forwarding the second EAP packet to the device in a sixth message;
encapsulating a third EAP packet which includes the response to the challenge from the second network into a third Ethernet frame in the fourth message;
receiving a seventh message, wherein the seventh message includes a fourth Ethernet frame which includes a fourth EAP packet with an information for allowing the device access to the second network; and
removing the fourth EAP packet and forwarding the fourth EAP packet to the device in an eighth message.

5. A method for authenticating a device comprising:
receiving, at a residential gateway, a first message, the first message including a first Extensible Authentication Protocol (EAP) packet which includes an EAP (Identify) ID response and a first destination address;
generating, by the residential gateway, a second message, the second message including the first EAP ID response and a second destination address which is different from the first destination address;
transmitting, by the residential gateway, the second message toward the second destination address;
the residential gateway receiving a third message, the third message including a response to an EAP challenge and the first destination address;
creating a fourth message which includes the response to the challenge from the authentication server network and the second destination address;
transmitting the fourth message to the second destination address;
encapsulating the first EAP packet into a first Ethernet frame in the second message;

receiving a fifth message, wherein the fifth message includes a second Ethernet frame with a second EAP packet which includes a challenge from the second network;

removing the second EAP packet and forwarding the second EAP packet to the device in a sixth message;

encapsulating a third EAP packet which includes the response to the challenge from the second network into a third Ethernet frame in the fourth message;

receiving a seventh message, wherein the seventh message includes a fourth Ethernet frame which includes a fourth EAP packet with an information for allowing the device access to the second network;

removing the fourth EAP packet and forwarding the fourth EAP packet to the device in an eighth message; and the first destination address being a multicast address selected from a Spanning Tree Protocol address range, the second destination address being a media access control (MAC) address of an access node associated with an authentication server, and the second destination address being swapped for said first destination address by the residential gateway.

6. The method of claim 5, wherein the device is located behind the residential gateway in a home network and the authentication server network is authenticating for a Fixed Broadband network.

7. The method of claim 5, wherein the device is located behind the residential gateway in a home network and the authentication server network is authenticating for a Fixed Broadband network.

8. A system for authenticating a device at an access node comprising:

a communications interface configured to receive a first message, wherein the first message includes a first Extensible Authentication Protocol (EAP) packet which includes an EAP (Identify) ID response and a first destination address; and a processor configured to generate a second message, wherein the second message includes the first EAP ID response and a second destination address which is different from the first destination address, wherein the second message is transmitted toward the second destination address and the first destination address being a media access control (MAC) address of the access node associated with an authentication server, the second destination address being a MAC address of an IP_Edge node associated with the authentication server, and the second destination address being swapped for the first destination address by the access node.

9. The system of claim 8 further comprising:

the communications interface of the access node configured to receive a third message, wherein the third message includes a response to an EAP challenge and the first destination address; and the processor of the access node configured to create a fourth message, which includes the response to the challenge from the authentication server network and the second destination address, wherein the fourth message is transmitted to the second destination address.

10. The system of claim 9, wherein the first EAP packet is encapsulated into a first Ethernet frame in the second message.

11. The system of claim 10 further comprising:

the communications interface of the access node configured to receive a fifth message, wherein the fifth message includes a second Ethernet frame with a second EAP packet which includes a challenge from the second network;

the processor of the access node configured to create a sixth message which includes the second EAP packet;

the communications interface of the access node configured to forward the sixth message to the device;

the access node configured to encapsulate a third EAP packet, which includes the response to the challenge from the second network into a third Ethernet frame in the fourth message;

the communications interface of the access node configured to receive a seventh message, wherein the seventh message includes a fourth Ethernet frame which includes a fourth EAP packet with an information for allowing the device access to the second network;

the processor of the access node configured to create an eighth message, which includes the fourth EAP packet; and the communications interface of the access node configured to forward the eighth message to the device.

12. A system for authenticating a device at residential gateway, the system comprising:

a communications interface configured to receive a first message, the first message including a first Extensible Authentication Protocol (EAP) packet which includes an EAP (Identify) ID response and a first destination address; and a processor configured to generate a second message, the second message including the first EAP ID response and a second destination address which is different from the first destination address, the second message being transmitted toward the second destination address, the first destination address being a multicast address selected from a Spanning Tree Protocol address range, and the second destination address being a media access control (MAC) address of an access node associated with an authentication server, the second destination address being swapped for said first destination address by the residential gateway, the first EAP packet being encapsulated into a first Ethernet frame in the second message;

the communications interface of the residential gateway configured to receive a third message, the third message including a response to an EAP challenge and the first destination address; and the processor of the residential gateway configured to create a fourth message, which includes the response to the challenge from the authentication server network and the second destination address, the fourth message being transmitted to the second destination address the communications interface of the residential gateway configured to receive a fifth message, the fifth message including a second Ethernet frame with a second EAP packet which includes a challenge from the second network;

the processor of the residential gateway configured to create a sixth message which includes the second EAP packet;

the communications interface of the residential gateway configured to forward the sixth message to the device;

the residential gateway configured to encapsulate a third EAP packet, which includes the response to the challenge from the second network into a third Ethernet frame in the fourth message;

the communications interface of the residential gateway configured to receive a seventh message, wherein the seventh message includes a fourth Ethernet frame which includes a fourth EAP packet with an information for allowing the device access to the second network;

the processor of the residential gateway configured to create an eighth message, which includes the fourth EAP packet; and the communications interface of the residential gateway configured to forward the eighth message to the device.

13. The system of claim 12, wherein the device is located behind the residential gateway in a home network and the authentication server network is authenticating for a Fixed Broadband network.

14. The system of claim 12, wherein the device is located behind the residential gateway in a home network and the authentication server network is authenticating for a Fixed Broadband network.

* * * * *

UNITED STATES PATENT AND TRADEMARK OFFICE
CERTIFICATE OF CORRECTION

| | |
|---|---|
| PATENT NO. | : 8,495,713 B2 |
| APPLICATION NO. | : 12/965552 |
| DATED | : July 23, 2013 |
| INVENTOR(S) | : Krishnan et al. |

It is certified that error appears in the above-identified patent and that said Letters Patent is hereby corrected as shown below:

In the Specification

In Column 6, Lines 11-12, delete "EAP_Identity_Request message 52" and insert -- EAP_Identity_Request message 54 --, therefor.

In Column 7, Lines 9-10, delete "EAP_Identity_Request message 52" and insert -- EAP_Identity_Request message 54 --, therefor.

Signed and Sealed this
Fifteenth Day of July, 2014

Michelle K. Lee
*Deputy Director of the United States Patent and Trademark Office*